US006401312B1

(12) United States Patent
Wang

(10) Patent No.: US 6,401,312 B1
(45) Date of Patent: Jun. 11, 2002

(54) HANGING HOOK

(75) Inventor: Su-Hsing Wang, Changhua Hsien (TW)

(73) Assignee: Chang Hau Co., Ltd. (TW)

( * ) Notice: Subject to any disclaimer, the term of this patent is extended or adjusted under 35 U.S.C. 154(b) by 0 days.

(21) Appl. No.: 09/788,383

(22) Filed: Feb. 21, 2001

(51) Int. Cl.$^7$ ................................................ F16B 45/04
(52) U.S. Cl. .................... 24/600.6; 24/600.4; 24/600.5; 24/598.4; 24/598.7; 24/265 H
(58) Field of Search .......................... 24/68 CT, 68 TT, 24/165, 265 AL, 265 H, 378.1, 369–376, 298–302, 598.4, 598.7, 599.1–600.2, 600.4–601.2, 905, 907; 59/84–87; 294/82.17, 82.21, 82.23, 82.24, 82.27, 82.31, 82.33, 82.34

(56) References Cited

U.S. PATENT DOCUMENTS

| 1,200,540 A | * | 10/1916 | Swedlund | 24/601.6 |
| 2,385,709 A | * | 9/1945 | Johnston | 24/600.6 |
| 2,608,736 A | * | 9/1952 | Balzewicz | 24/599.7 |
| 3,815,184 A | * | 6/1974 | Hopp | 24/600.7 |
| 3,859,693 A | * | 1/1975 | Breed | 24/600.7 |
| 4,577,374 A | * | 3/1986 | Lii | 24/165 |
| 5,156,430 A | * | 10/1992 | Mori | 294/82.23 |
| 5,438,736 A | * | 8/1995 | Terada et al. | 24/599.8 |
| 5,499,432 A | * | 3/1996 | Terada et al. | 24/599.2 |

FOREIGN PATENT DOCUMENTS

| CH | 96032 | * | 9/1922 | 24/600.6 |
| GB | 677224 | * | 8/1955 | 24/600.4 |

* cited by examiner

Primary Examiner—Anthony Knight
Assistant Examiner—Ruth G. Rodriguez
(74) Attorney, Agent, or Firm—Troxell Law Office PLLC

(57) ABSTRACT

Hanging hook including a hook section, a latch member, a spring, a restricting column, a ring body and a C-shaped latch ring. The hook section has a stem body a lower end of which is formed with an annular stop section. One side of the stop section is cut with a restricting split. The other side of the stop section is provided with a downward extending hook. An upper end of the stem body is pivotally connected with the ring body. An upper side of the latch member is formed with a receiving hole. A bottom face of the receiving hole is formed with a through hole. One side of the latch member is formed with a downward extending latch arm. A lower side of the restricting column is provided with a small diameter fitting post. A stop face is defined between the small diameter section and the large diameter section of the restricting column. The restricting column is formed with a central passage.

1 Claim, 4 Drawing Sheets

HANGING HOOK

BACKGROUND OF THE INVENTION

The present invention is related to an improved hanging hook. Prior to assembly of the hanging hook, the surfaces of the components can be respectively plated with non-metal colors. Then the components are assembled so as to achieve a beautiful and colorful appearance of the hanging hook. The hanging hook can be easy, quick and accurately operated to hook an article.

FIG. 1 shows a conventional hanging hook 10 having a hook section 11 formed with an internal cavity. A spring and a latch block 12 are received in the cavity and pivotally connected with the hook section 11 by a shaft pin 13. The latch block 12 can be pressed inward. A ring body 14 is pivotally disposed on the hook section 11. For presenting colorful appearance of the hanging hook 10, prior to assembly, the surfaces of the components are respectively plated with non-metal colors. Then the components are assembled. However, when the pivot pin 13 is passed through the hook section 11 and the latch block 12, the paint of the periphery of the pivot section A is subject to detachment so that the appearance of the hanging hook 10 will be deteriorated. In the case that metallic materials with different colors are plated on the surfaces of the components, since the metallic materials only have a few fixed colors so that the appearance will be monotonous.

FIG. 2 shows another type of conventional hanging hook 20 having a hook section 21. The upper portion of the hook section 21 is formed with a cavity in which a spring and a T-shaped latch body 22 are received. The T-shaped latch body 22 can be pressed inward. A ring body 23 is pivotally disposed on the hook section 21. For presenting colorful appearance of the hanging hook 20, prior to assembly, the surfaces of the components are respectively plated with non-metal colors. Then the components are assembled. However, when assembled, it is necessary to first bias the end section of the hook section 21 with a hand and then install the spring and the T-shaped latch body 22. The paint of the biased section B tends to detach therefrom. Therefore, the appearance of the hanging hook 20 will be deteriorated. In the case that metallic materials with different colors are plated on the surfaces of the components, since the metallic materials only have a few fixed colors so that the appearance will be monotonous.

FIG. 3 shows still another type of Conventional hanging hook 30 having a hook section 31, a spring 32, a press button 33, a latch member 34 and a ring body 35. The hook section 31 has a stem body 311. A lower end of the stem body 311 is formed with an annular stop section 312. One side of the stop section 312 is cut with a restricting split 313. The other side is provided with a downward extending a hook 314. The stem body 311 is formed with a socket 315 above the split 313. The upper portion of the stem body is formed with an annular groove 316 for pivotally connecting with the ring body 35. The press button 33 is a two-step cylindrical body having an outer large diameter section and an inner small diameter section. A dome section 331 is disposed at end face of the large diameter section. The latch member 34 is a hoop member fitted on the stem body 311 of the hook section 31. One side of the latch member 34 is formed with a downward extending latch arm 342. The periphery of the latch member 34 is formed with a through hole 341 above the latch arm 342. When assembled, as shown in FIG. 4, the spring 32 is first placed into the socket 315 of the hook section 31 and the press button 33 is pressed into the socket 315 to resiliently compress the spring 32. The dome section 331 of the press button 33 protrudes out of the socket 315. Then, the latch member 34 is fitted onto the stem body 311 of the hook section 31 with the latch arm 342 fitted into the restricting split 313 of the hook section 31. At this time, the dome section 331 is engaged in the through hole 341 of the latch member 34. The bottom face of the latch member 34 is stopped by the stop section 312 of the hook section 31. The end of the latch arm 342 is leant on the end of the hook 314 of the hook section 31. Then, the ring body 35 is pivotally fitted in the annular groove 316. In use, a user needs to press the dome section 311 to compress the spring 32 and disengage the dome section 331 from the through hole 341 of the latch member 34 (as shown in FIG. 4). Then the latch member 34 is pushed upward to slide the latch arm 342 out of the restricting split 313 of the hook section 31.

At this time, the press button 33 is pressed against the latch arm 342 and the hook 314 can hook an article. Then, the latch member 34 is pushed back downward to again insert the latch arm 342 into the restricting split 313. Under such circumstance, the dome section 331 is again engaged in the through hole 341 of the latch member 34 with the end of the latch arm 342 again leant against the end of the hook 314. Such operation is quite troublesome. Moreover, when pressing the dome section 331 with a finger, it often takes place that the dome section 331 fails to disengage from the through hole 341 and remains engaged therein. Therefore, the latch member 34 can be hardly successfully pushed out. This leads to inconvenience in use.

SUMMARY OF THE INVENTION

It is therefore a primary object of the present invention to provide an improved hanging hook in which it is unnecessary to use any pivot pin for pivotally connecting the components or bias the hook section. Therefore, prior to assembly, the surfaces of the components can be respectively plated with non-metal colors. Then the components are assembled. After assembled, the paint is not subject to detachment so that the appearance of the hanging hook will remain beautiful and colorful.

It is a further object of the present invention to provide the above hanging hook in which in use, by means of only one time of operation, the latch member is directly upward pushed with a finger, permitting the hook of the hook section to hook a desired article. When the latch member is released, the spring is restored so that the article is encompassed. Such operation is easy, quick and accurate.

The present invention can be best understood through the following description and accompanying drawings wherein:

DETAILED DESCRIPTION OF THE PREFERRED EMBODIMENT

Figure 5:
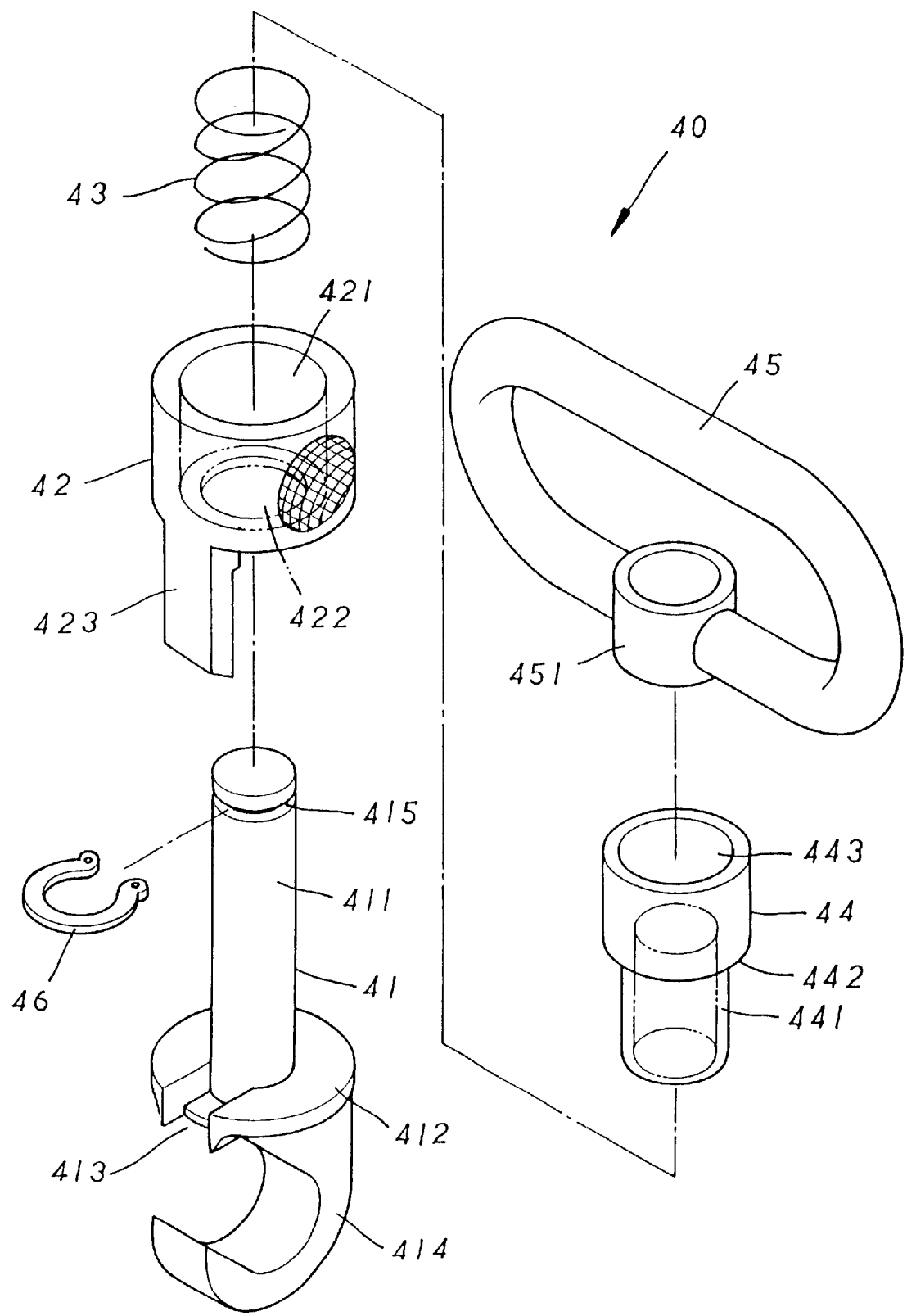
FIG. 5 is a perspective exploded view of the hanging hook of the present invention.

Please refer to FIG. 5. The hanging hook 40 of the present invention includes a hook section 41, a latch member 42, a spring 43, a restricting column 44, a ring body 45 and a C-shaped latch ring 46. The hook section 41 has a stem body 411. A lower end of the stem body 411 is formed with an annular stop section 412. One side of the stop section 412 is cut with a restricting split 413. The other side is provided with a downward extending hook 414. The upper end of the stem body 411 is formed with an annular groove 415. The upper side of the latch member 42 is formed with a receiving hole 421. The bottom face of the receiving hole 421 is formed with a through hole 422. Two sides of the periphery of the latch member 42 are formed with slipproof stripes. One side of the latch member 42 is formed with a downward extending latch arm 423 between the slipproof stripes. The lower side of the restricting column 44 is provided with a small diameter fitting post 441 on which the spring 43 is fitted and located. The outer diameter of the fitting post 441 is slightly smaller than the inner diameter of the through hole 422 of the latch member 42. A stop face 442 is defined between the small diameter section and the large diameter section of the restricting column 44. The restricting column 44 is formed with a central passage 443. The ring body 45 is a close ring body. The center of lower side thereof is provided with a hoop 451.

Figure 2:
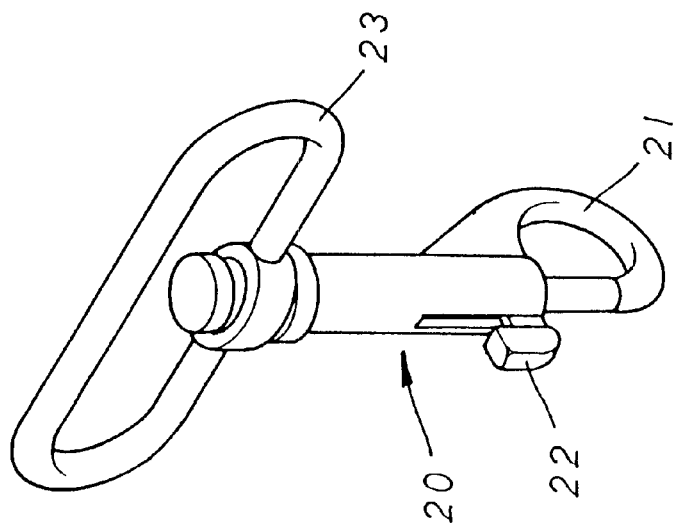
FIG. 2 is a perspective assembled view of another type of conventional hanging hook.
Figure 1:
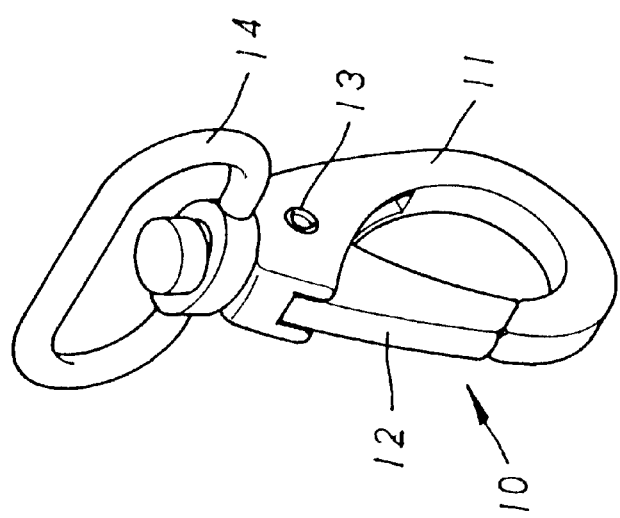
FIG. 1 is a perspective assembled view of a conventional hanging hook.
Figure 3:
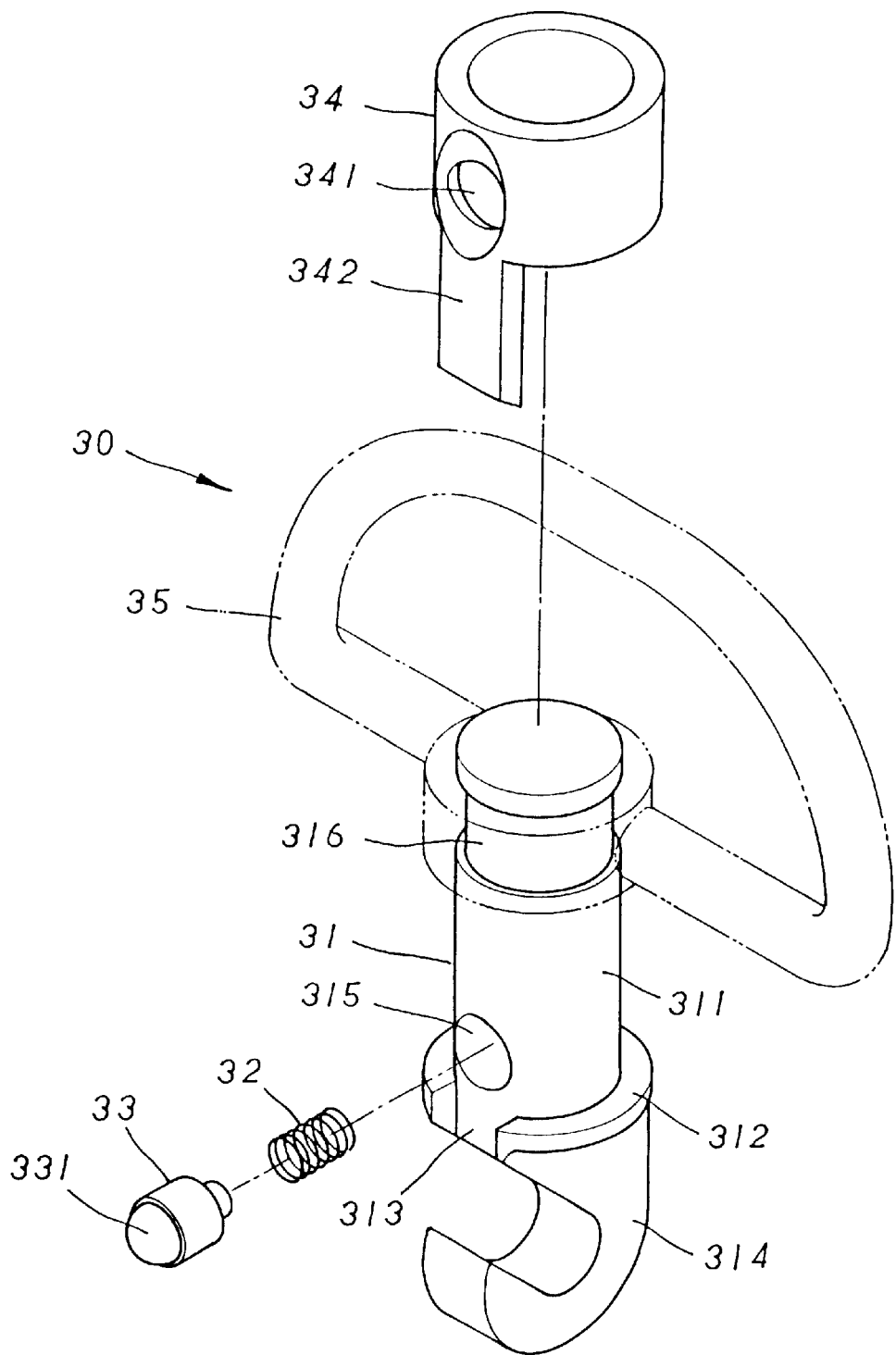
FIG. 3 is a perspective exploded view of still another type of conventional hanging hook.
Figure 6:
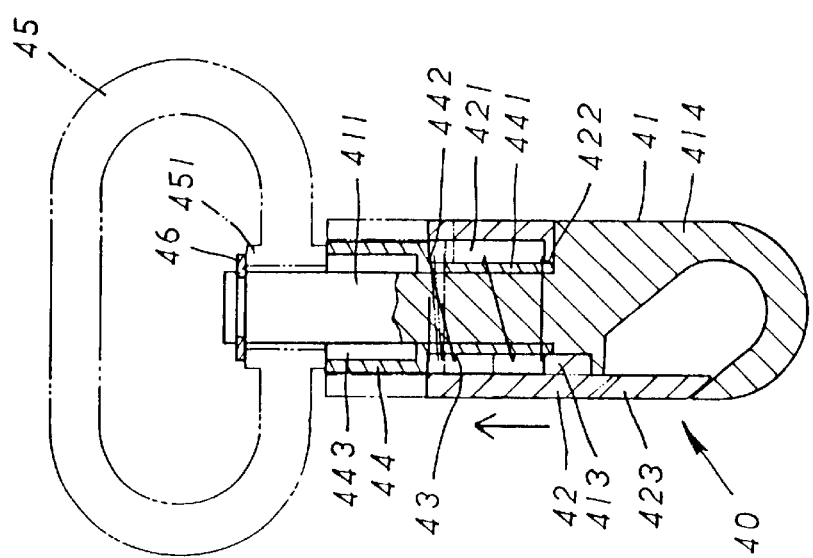
FIG. 6 is a sectional assembled view of the hanging hook of the present invention, showing the operation thereof.
Figure 4:
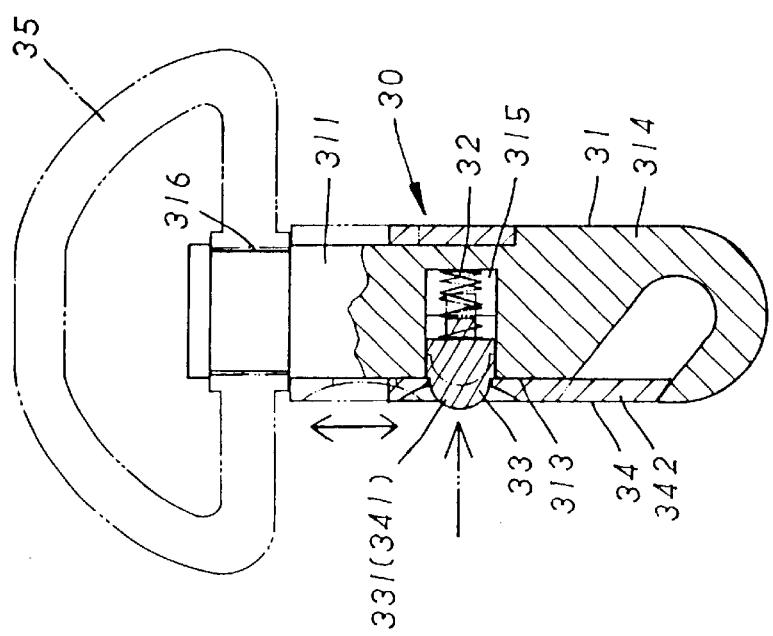
FIG. 4 is a sectional assembled view of the conventional hanging hook of FIG. 3, showing the operation thereof.

When assembled, as shown in FIG. 6, the spring 43 is first fitted on the fitting post 441 of the restricting column 44 and then together with the restricting column 44 placed into the receiving hole 421 of the latch member 42. The restricting column 44 is passed through the through hole 422 of the latch member 42. One end of the spring 43 is stopped by the stop face 442 of the restricting column 44. The other end thereof is leant on the bottom face of the receiving hole 421 of the latch member 42. Then, the latch member 42 together with the spring 43 and restricting column 44 is fitted onto the stem body 411 of the hook section 41. The latch arm 423 of the latch member 42 is inserted into the restricting split 413 of the hook section 41 and leant against and located on the stop section 412 of the hook section 41. The end of the latch arm 423 is leant on the end of the hook 414. Then, the hoop 451 of the ring body 45 is fitted onto the stem body 411 of the hook section 41 to press the restricting column 44 to make the bottom face of the fitting post 441 abutting against the stop section 412 of the hook section 41. The spring 43 is compressed to a certain extent. Then, the C-shaped latch ring 46 is fitted into the annular groove 415 of the hook section 41 to pivotally connect the ring body 45 on the hook section 41.

In use, as shown in FIG. 6, the latch member 42 is directly upward pushed with a finger to compress the spring 43. At this time, the latch arm 423 of the latch member 42 is slided out of the restricting split 413 of the hook section 41. Accordingly, the hook 414 of the hook section 41 can be easily and quickly hooked with a desired article. Then, the latch member 42 is released to restore the spring 43 so as to encompass the article.

The present invention has the following advantages:

1. It is unnecessary to use any pivot pin for pivotally connecting the components or bias the hook section. Therefore, prior to assembly, the surfaces of the components can be respectively plated with non-metal colors. Then the components are assembled. After assembled, the paint is not subject to detachment so that the appearance of the hanging hook will remain beautiful and colorful.

2. In use, by means of only one time of operation, the latch member 42 is directly upward pushed, permitting the hook 414 of the hook section 41 to hook a desired article. When the latch member 42 is released, the spring 43 is restored so that the article is encompassed. Such operation is easy, quick and accurate.

The above embodiment is only used to illustrate the present invention not intended to limit the scope thereof. Many modifications of the above embodiment can be made without departing from the spirit of the present invention.

What is claimed is:

1. Hanging hook comprising a hook section, a latch member, a spring, a restricting column, a ring body and a C-shaped latch ring, the hook section having a stem body, a lower end of the stem body being formed with an annular stop section, one side of the stop section being cut with a restricting split, the other side of the stop section being provided with a downward extending hook, an upper end of the stem body being pivotally connected with the ring body, the latch member being fitted on the stem body of the hook section, one side of the latch member being formed with a downward extending latch arm inserted in the restricting split of the hook section, an end of the latch arm being leant on the end of the hook of the hook section, said hanging hook being characterized in that an upper side of the latch member is formed with a receiving hole, a bottom face of the receiving hole being formed with a through hole, a lower side of the restricting column being provided with a small diameter fitting post, an outer diameter of the fitting post being slightly smaller than an inner diameter of the through hole of the latch member, a stop face being defined between the small diameter section and the large diameter section of the restricting column, the restricting column being formed with a central passage, the spring being fitted on the fitting post of the restricting column and together with the restricting column placed into the receiving hole of the latch member, the restricting column being passed through the through hole of the latch member, one end of the spring being stopped by the stop face of the restricting column, the other end of the spring being leant on the bottom face of the receiving hole of the latch member.

* * * * *